UNITED STATES PATENT OFFICE.

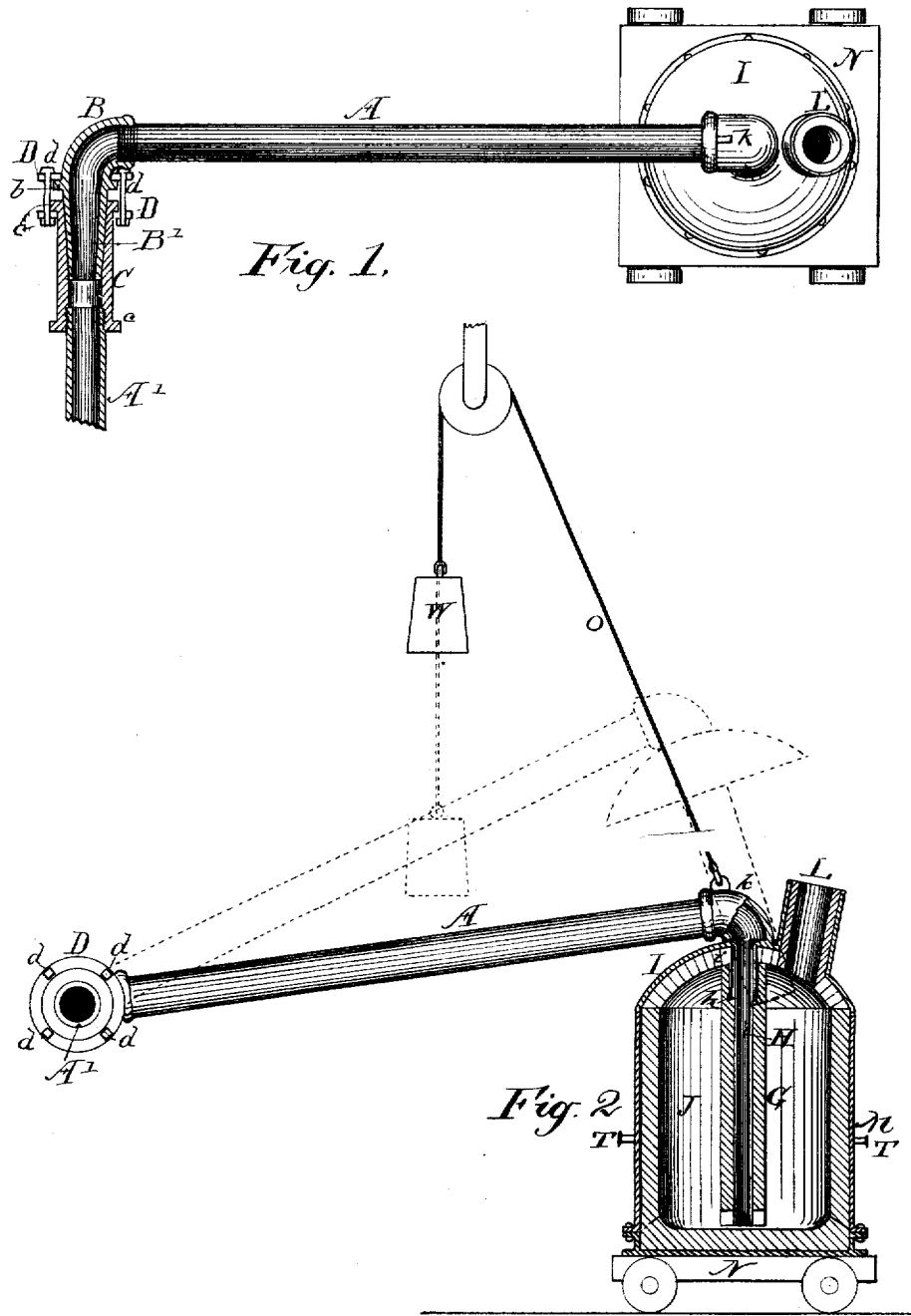

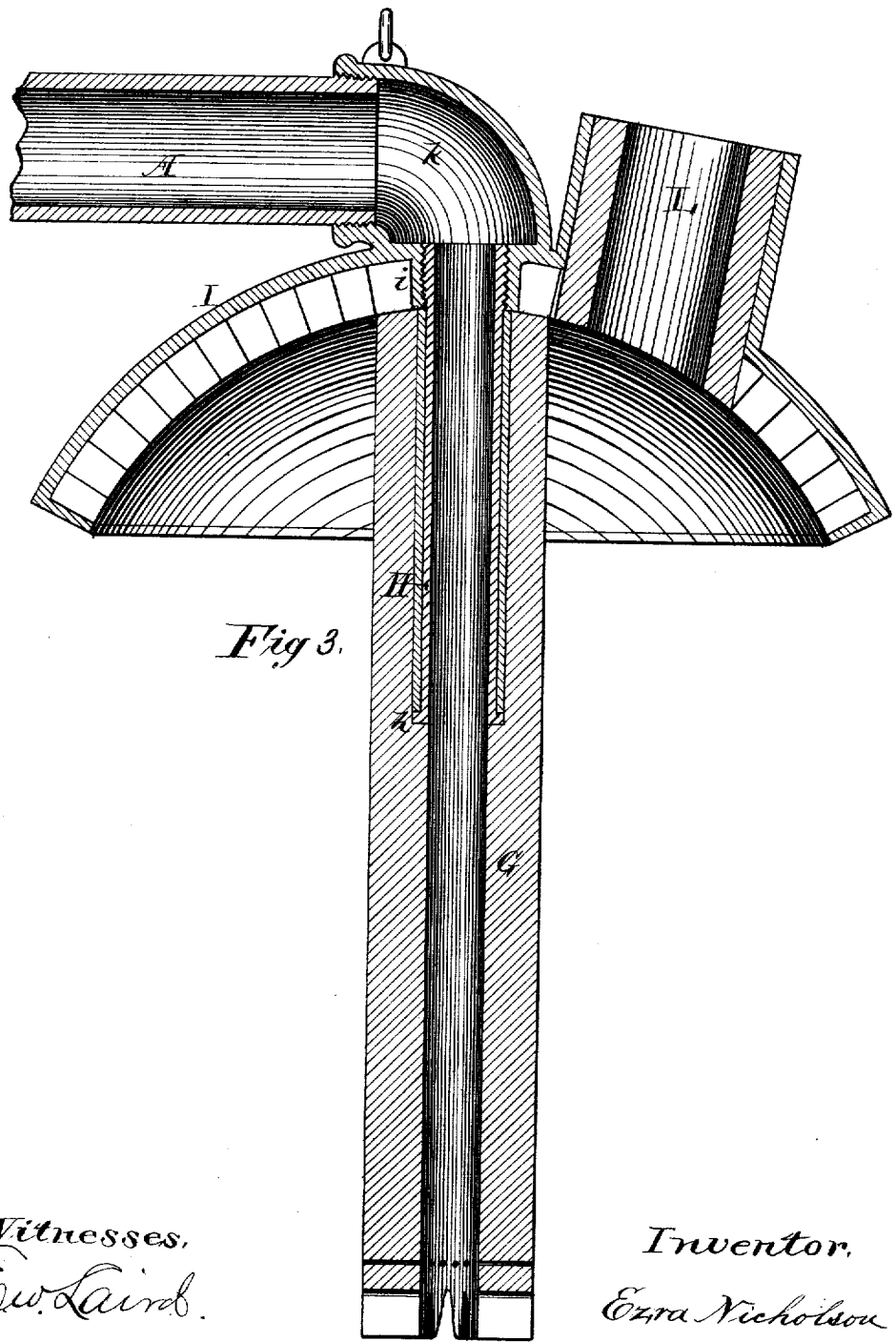

EZRA NICHOLSON, OF CLEVELAND, OHIO.

APPARATUS FOR MAKING STEEL.

SPECIFICATION forming part of Letters Patent No. 340,000, dated April 13, 1886.

Application filed December 5, 1884. Serial No. 149,606. (No model.)

*To all whom it may concern:*

Be it known that I, EZRA NICHOLSON, of Cleveland, in the county of Cuyahoga and State of Ohio, have invented certain new and useful Improvements in Apparatus for Making Steel, of which the following is a specification.

This invention is an improvement in apparatus used in the Bessemer process.

It consists in the combination of the pipe through which the air is forced with a second pipe pivoted thereto, a dip-pipe attached to the latter, a receptacle for molten liquid, which receives said dip-pipe, and a joint between the two pipes first mentioned, which consists of a tapering elbow and a sleeve having corresponding internal shape, the construction of said elbow and sleeve allowing the rotary movement of the pivoted pipe, and also allowing said parts of the joints to be adjusted telescopically in compensating for wear.

In the drawings, Figure 1 is a plan view of the apparatus with the joint in section. Fig. 2 is a side elevation with the portable vessel and fire-clay end of dip-pipe in section. Fig. 3 represents a vertical section of the dip-pipe, showing its construction, on an enlarged scale.

A is a common iron pipe connected to a pipe, A', leading from an air compressor or a blower by a joint, enabling it to be raised at its opposite end. Said joint consists of an elbow, B, having a tapering end, B', and provided with a flange, *b*. Said taper is fitted to turn in a sleeve, C, to which the pipe A' is attached. It has a flange, *c*, at each end. Said sleeve is held in position by wings D D, resting against the flanges *b* and *c* and bolted together with bolts *d d*. With this construction of tapering joint the wear and loosening which may take place may readily be remedied by tightening up the bolts.

G is a fire-clay pipe, in the upper part of which is fitted and secured an iron pipe, H, having an annular flange, *h*. The base of the upper portion of the pipe G is enlarged to receive the iron pipe, which is secured therein by filling in the space around the iron pipe down to the flange with plastic material. The upper end of pipe H projects above the clay-pipe, and is screw-threaded, for the purpose of attaching it to the cover I of the vessel J.

The cover I consists of semi-spherical hood, which may be of cast-iron, provided with a screw-threaded neck, *i*, into which the aforesaid pipe H is screwed. Said cover also has a boss or elbow, *k*, for attaching it to the pipe A. The hood I is provided with an annular flange at its lower edge, which holds a fire-clay lining, and is also provided with a fire-clay-lined tube, L, for the flames, &c., to escape during the process of blowing.

M is a portable vessel consisting of an iron shell lined with fire-clay, and may be mounted on a truck, N, for moving it about, and is also provided with trunnions T, for the purpose of lifting it with a crane, if desired.

For raising the dip-pipe and the cover, a rope or chain is attached to a ring, O, on the boss *k*, and passes over a pulley overhead, and having a counterbalance-weight, W. This enables the pipe and cover to be raised with ease for clearing the pipe from the vessel for removing it from under said pipe, as seen in dotted lines in Fig. 2.

I am aware that it is not new to combine a pivoted blast-pipe having a dip-pipe and cap attached thereto with a receptacle for molten metal, which is covered by said cap, and into which said dip-pipe extends. I am also aware that it is not new to provide such a pivoted pipe, thus combined, with a counterbalance-weight. I am further aware that a joint composed of a tapering pipe and a correspondingly-shaped sleeve is not broadly new. I do not claim, broadly, any of such constructions; but, Having described my invention, I claim—

In combination with pipes A, A', and H and vessel J, arranged as described, the tapering elbow B, which is attached to pipe A and free to turn therewith, and the sleeve C, having a corresponding internal taper and attached to pipe A', said parts B C constituting a joint which allows turning, and also telescopic adjustment to compensate for wear, substantially as set forth.

EZRA NICHOLSON.

Witnesses:
GEO. W. TIBBITTS,
M. G. NORTON.